United States Patent [19]

Hansen et al.

[11] Patent Number: 5,247,071
[45] Date of Patent: Sep. 21, 1993

[54] PREPARATION OF ACETALIZED AZO DYES

[75] Inventors: Guenter Hansen, Ludwigshafen; Georg Zeidler, Dannstadt-Schauernheim, both of Fed. Rep. of Germany

[73] Assignee: BASF Aktiengesellschaft, Ludwigshafen, Fed. Rep. of Germany

[21] Appl. No.: 894,458

[22] Filed: Jun. 5, 1992

[30] Foreign Application Priority Data

Jun. 20, 1991 [DE] Fed. Rep. of Germany ....... 4120363

[51] Int. Cl.$^5$ .............................................. C09B 43/28
[52] U.S. Cl. .................... 534/596; 534/581; 534/831; 534/856
[58] Field of Search ............... 534/581, 596, 831, 856

[56] References Cited

U.S. PATENT DOCUMENTS 3,244,753  4/1966  Leary .................................. 568/593
4,011,209  3/1977  De Feo et al. .................. 534/856 X
4,904,765  2/1990  Derber et al. .................. 534/856 X

FOREIGN PATENT DOCUMENTS 256460   2/1988  European Pat. Off. .
2129590 12/1971  Fed. Rep. of Germany .

Primary Examiner—Robert W. Ramsuer
Assistant Examiner—Fiona T. Powers
Attorney, Agent, or Firm—Oblon, Spivak, McClelland, Maier & Neustadt

[57] ABSTRACT

Acetalized azo dyes are prepared by diazotizing an amine, coupling with a hydroxyalkyl-containing coupling component and subsequently reacting with a vinyl ether in a process which comprises carrying out the coupling reaction in a two-phase reaction mixture comprising water and an aromatic hydrocarbon, subsequently separating off the aqueous phase and reacting the azo dye, which is present in the organic phase, without intermediate isolation, with a vinyl ether in the presence of a polybasic carboxylic acid as catalyst.

4 Claims, No Drawings

PREPARATION OF ACETALIZED AZO DYES

The present invention relates to a novel process for preparing acetalized azo dyes diazotizing an amine, coupling with a hydroxyalkyl-containing coupling component and subsequently reacting with a vinyl ether.

DE-A-2 129 590 discloses acetalized azo dyes. However, the method of preparation described therein is complicated, since the dyes have to be isolated before the acetalization step. Moreover, the acetalization reaction does not proceed wholly satisfactorily, since it frequently gives rise to sediments which interfere with the use of the acetalized dye in mineral oils.

It is an object of the present invention to provide a novel possible to dispense with the intermediate isolation of the nonacetalized azo dye and which gives the target products in a satisfactory form for use.

We have found that this object is achieved by a process for preparing dyes of the formula I

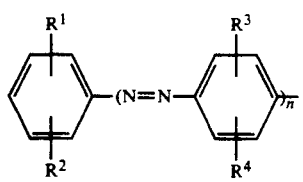

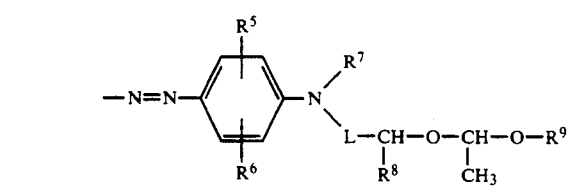

where
n is zero or 1,
$R^1$, $R^2$, $R^3$ and $R^5$ are identical or different and each is independently of the others hydrogen, $C_1$-$C_4$-alkyl, $C_1$-$C_4$-alkoxy, halogen or nitro,
$R^4$ and $R^5$ are identical or different and each is independently of the other hydrogen, $C_1$-$C_4$-alkyl, $C_1$-$C_4$-alkoxy, halogen, nitro or $C_1$-$C_4$-alkanoylamino,
$R^7$ is $C_1$-$C_4$-alkyl,
$R^8$ is hydrogen or $C_1$-$C_4$-alkyl,
$R_9$ is $C_1$-$C_{18}$-alkyl or cyclohexyl, and
L is $C_1$-$C_3$-alkylene,
coupling the diazonium salt of the amine of the formula II

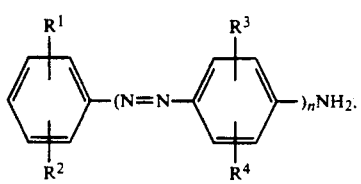

where n, $R^1$, $R^2$, $R^3$ and $R^4$ are each as defined above, with the coupling component of the formula III

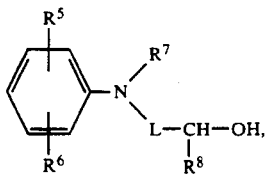

where $R^5$, $R^6$, $R^7$, $R^8$ and L are each as defined above, and subsequently reacting the resulting dye of the formula IV

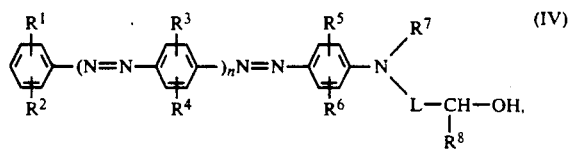

where, n, $R^1$, $R^2$, $R^3$, $R^4$, $R^5$, $R^6$, $R^7$, $R^8$ and L are each as defined above, with a vinyl ether of the formula $$CH_2=CH-OR^9 \qquad (V)$$

where $R^9$ is as defined above, which comprises carrying out the coupling reaction in a two-phase reaction mixture comprising water and an aromatic hydrocarbon, subsequently separating off the aqueous phase and reacting the dye of the formula IV, which is present in the organic phase, without intermediate isolation, with a vinyl ether of the formula V in the presence of a polybasic carboxylic acid as catalyst.

Any alkyl or alkylene appearing in the abovementioned formulae may be straight-chain or branched.

$R^1$, $R^2$, $R^3$, $R^4$, $R^5$, $R^6$, $R^7$, $R^8$ and $R^9$ are each for example methyl, ethyl, propyl, isopropyl, butyl, isobutyl or sec-butyl.

$R^1$, $R^2$, $R^3$, $R^4$, $R^5$ and $R^6$ may each also be for example methoxy, ethoxy, propoxy, isopropyoxy, butoxy, isobutoxy, sec-butoxy, fluorine, chlorine or bromine.

$R^4$ and $R^5$ may each also be for example formylamino, acetylamino, propionylamino or butyrylamino.

$R^9$ may also be for example pentyl, isopentyl, neopentyl, tert-pentyl, hexyl, 2-methylpentyl, heptyl, 1-ethylpentyl, octyl, 2-ethylhexyl, isooctyl, nonyl, isononyl, decyl, isodecyl, undecyl, dodecyl, tridecyl, heptadecyl or octadecyl (the above designations isooctyl, isononyl, isodecyl and isotridecyl are trivial names derived from the oxo process alcohols—cf. Ullmanns Encyklopädie der technischen Chemie, 4th Edition, Volume 7, pages 215 to 217, and also Volume 11, pages 435 and 436).

L is for example methylene, ethylene, 1,2- or 1,3-propylene, ethylidene or propylidene.

Of particular suitably is a process for preparing dyes of the formula I where $R^1$, $R^2$, $R^3$, $R^4$, $R^5$ and $R^6$ are each independently of the others hydrogen, methyl, methoxy or nitro.

Preference is given to a process for preparing dyes of the formula I where n is zero.

Preference is further given to a process for preparing dyes of the formula I where $R^1$, $R^2$, $R^3$, $R^4$, $R^5$ and $R^6$ are each hydrogen.

Preference is further given to a process for preparing dyes of the formula I where $R^8$ is hydrogen, $R^9$ is $C_1$-$C_8$-alkyl and L is $C_1$- or $C_2$-alkylene.

Of very particular commercial interest is a process for preparing the dye of the formula

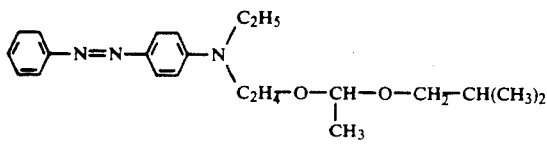

Suitable aromatic hydrocarbons for use in the process of the invention are for example benzene, $C_1$-$C_6$-mono-, -di- or -trialkylbenzenes such as toluene, ethylbenzene or o-, m- or p-xylene, chlorobenzene, o-dichlorobenzene, dimethylnaphthalene or mixtures thereof is preferred.

The use of toluene, o-, m-, or p-xylene or mixtures thereof is preferred.

Suitable polybasic carboxylic acids for use in the process of the invention are in particular di- or tribasic carboxylic acids, such as fumaric acid, maleic acid, citric acid, oxalic acid or terephthalic acid.

The use of dibasic carboxylic acids, in particular maleic acid, as catalyst is preferred.

The process of the invention is conveniently carried out by diazotizing the amine II in a conventional manner, for example with an alkali metal nitrite such as sodium nitrite or potassium nitrite, and a mineral acid, for example hydrochloric acid or sulfuric acid, to produce a diazonium salt in aqueous medium, and admixing the resulting suspension at from 31 10° to +10° C., preferably at from −5° to +8° C., with a solution of coupling component III in an aromatic hydrocarbon. This solution generally contains from 30 to 60% by weight, preferably from 40 to 50% by weight, of coupling component III, each percentage being based on the weight of the solution.

The two-phase reaction mixture is buffered to pH 3-5, for example by the addition of aqueous sodium acetate solution, and stirred at from 15° to 25° C. for from 3 to 5 hours.

The reaction mixture is then heated to 75°-95° C. and the aqueous phase is separated from the organic phase, which contains the dye of formula IV.

To ensure complete dewatering, the organic phase can be subjected to an azeotropic distillation. The thus dewatered organic phase can then be used directly for the acetalization step.

In some cases it is also of advantage to remove all or some of the aromatic hydrocarbon used in the two-phase coupling reaction and replace it with another aromatic hydrocarbon. This is of importance in particular when the dye I obtained as reaction product of the process of the invention is to be used directly in a solution in its field of application, namely the marking of mineral oils. This is because, in order to meet certain prescribed specifications, generally only specific solvents are employed here, for example xylene or a high-boiling aromatics mixture (Shellsol ® AB from Shell).

To the solution of the dye IV in the aromatic hydrocarbon, which in general is at from 75° to 100° C. is then added the polybasic carboxylic acid as catalyst. This is followed by the addition of the vinyl ether V at from 75° to 125° C. Stirring at from 75° to 125° C. for from 3 to 10 hours then completes the acetalization, and excess vinyl ether is distilled off if necessary. The polybasic carboxylic acid used as catalyst can then be removed from the reaction mixture, for example by filtration, and be recycled into the process if desired.

The resulting solution of the dye I is directly ready for use.

To prepare the dye IV, the diazonium salt of the amine II and the coupling component III are in general reacted in a molar ratio of from 1:095 to 1:105.

The amount of vinyl ether V required for the acetalization is in general from 1.4 to 1.7 mol per mole of amine II.

The amount of catalyst is in general from 0.8 to 5, preferably from 1 to 3.5%, by weight, each percentage being based on the weight of amine II.

The novel process gives the acetalized azo dyes of the formula I in a simple manner and in high yield and purity. The process of the invention does not require any intermediate isolation of the nonacetalized azo dye. Moreover, it gives the target products in a satisfactory form for further use, so that the reaction mixture can be used directly.

The acetalized azo dyes of the formula I are useful marker substance for mineral oil (see for example EP-A-256 460), which can be used together with oil-soluble dyes.

The Examples which follow will further illustrate the invention.

EXAMPLE 1

93 g (1 mol) of aniline were added dropwise to a mixture of 165 ml of water and 167 g of sulfuric acid (75% strength by weight) in the course of 30 minutes, during which the temperature increase was limited to 50° C. by external cooling. After the suspension of the resulting aniline sulfate had been cooled to 0°-5° C., 430 g of ice were added. This was followed by diazotization with 230 ml of 30% by weight sodium nitrite solution at from 0° to 8° C. in the course of 30 minutes. After stirring at from 0° to 5° C. for 1 hour the excess nitrite was destroyed with amidosulfuric acid. After addition of 7.5 g of surfactant based on ethoxylated oleylamine, a solution of 161 g (0.975 mol) of N-ethyl-N-(2-hydroxyethyl-)aniline in 150 ml of toluene was added with intensive stirring in the course of 60 minutes, during which the pH mixture rose to about 3. The pH was then raised with sodium acetate solution to 4.0 at not more than 15° C. This required 556 g of sodium acetate solution (30% by weight) in the course of 2 hours. The coupling reaction was complete after a further 4 The resulting suspension was then heated to 90° C., and the dye product obtained was dissolved in the organic medium. Then the stirring was discontinued. After a delay time of about 15 minutes the lower, aqueous phase was separated of completely. The organic solution remaining behind was diluted with 150 ml of toluene and dewatered by azeotropic distillation.

To the remaining organic phase were added 1.25 g of maleic acid, followed by 154 g (1.54 mol) of vinyl isobutyl ether in the course of 35 minutes, added dropwise. On completion of the addition, the temperature was raised to 100°-105° C. and the mixture was subsequently stirred at the temperature for 5 hours.

The reaction mixture was then cooled down to about 80° C. and excess vinyl isobutyl ether was distilled off under reduced pressure at an unchanged flask temperature.

The remaining dye solution was then filtered under reduced pressure at from 50° to 60° C. through a glass filter nutsche (No. 3) in order to separate off the maleic acid used as catalyst.

Yield: 468 g of dye solution having a dye content of 369 g.

The same method gives the dyes of the formula

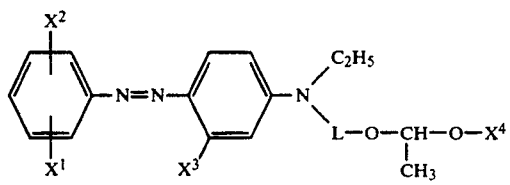

listed in the following table:

| Ex. No. | $X^1$ | $X^2$ | $X^3$ | L | $X^4$ |
|---|---|---|---|---|---|
| 2 | 2-$CH_3$ | H | H | $C_2H_4$ | $CH_2$—$CH(CH_3)_2$ |
| 3 | 3-$CH_3$ | H | H | $C_2H_4$ | $CH_2$—$CH(CH_3)_2$ |
| 4 | 4-$CH_3$ | H | H | $C_2H_4$ | $CH_2$—$CH(CH_3)_2$ |
| 5 | 2-$CH_3$ | H | H | $C_2H_4$ | $CH_2$—$CH(C_2H_5)(C_4H_9)$ |
| 6 | 2-$CH_3$ | H | H | $C_2H_4$ | $C_6H_{11}$ |
| 7 | 2-$CH_3$ | H | H | $C_2H_4$ | iso-$C_9H_{19}$ |
| 8 | 2-$CH_3$ | H | $CH_3$ | $C_2H_4$ | $CH_2$—$CH(CH_3)_2$ |
| 9 | 3-$CH_3$ | H | H | $C_3H_6$ | $CH_2$—$CH(CH_3)_2$ |
| 10 | 2-$OCH_3$ | H | H | $C_2H_4$ | $CH_2$—$CH(CH_3)_2$ |
| 11 | 3-$OCH_3$ | H | H | $C_3H_6$ | $CH_2$—$CH(CH_3)_2$ |
| 12 | 4-$OCH_3$ | H | $CH_3$ | $C_2H_4$ | $CH_2$—$CH(C_2H_5)(C_4H_9)$ |
| 13 | 4-$OCH_3$ | H | H | $C_2H_4$ | $CH_2$—$CH(CH_3)_2$ |
| 14 | 2-$OCH_3$ | H | H | $C_2H_4$ | iso-$C_9H_{19}$ |
| 15 | 2-$OCH_3$ | H | $CH_3$ | $C_3H_6$ | $C_6H_{11}$ |
| 16 | 3-$OCH_3$ | H | $CH_3$ | $C_2H_4$ | $CH_2$—$CH(CH_3)_2$ |
| 17 | 4-$OCH_3$ | H | H | $C_3H_6$ | $CH_2$—$CH(CH_3)_2$ |
| 18 | 2-$NO_2$ | 4-$NO_2$ | H | $C_2H_4$ | $CH_3$—$CH(CH_3)_2$ |

We claim:
1. A process for preparing a dye of the formula I

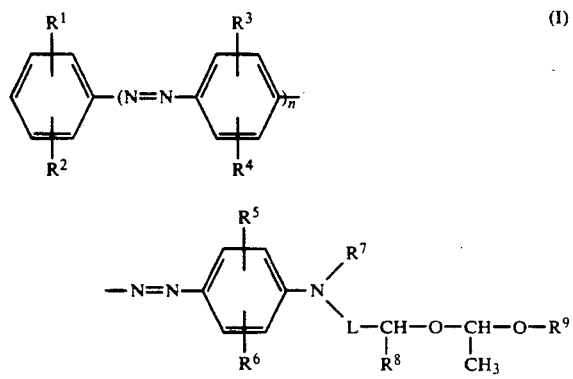

where
  n is zero or 1,
  $R^1$, $R^2$, $R^3$ and $R^5$ are identical or different and each is independently of the others hydrogen, $C_1$-$C_4$-alkyl, $C_1$-$C_4$-alkoxy, halogen or nitro,
  $R^4$ and $R^5$ are identical or different and each is independently of the other hydrogen, $C_1$-$C_4$-alkyl, $C_1$-$C_4$-alkoxy, halogen, nitro or $C_1$-$C_4$-alkanoylamino,
  $R^7$ is $C_1$-$C_4$-alkyl,
  $R^8$ is hydrogen or $C_1$-$C_4$-alkyl,
  $R_9$ is $C_1$-$C_{18}$-alkyl or cyclohexyl, and
  L is $C_1$-$C_3$-alkylene,
coupling the diazonium salt of the amine of the formula II

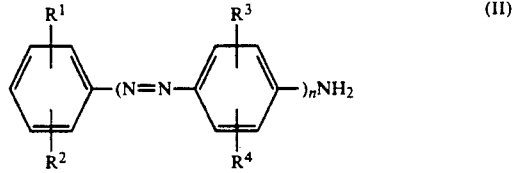

where n, $R^1$, $R^2$, $R^3$ and $R^4$ are each as defined above, with the coupling component of the formula III

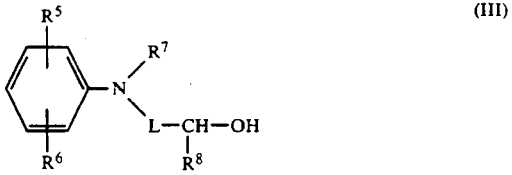

where $R^5$, $R^6$, $R^7$, $R^8$ and L are each as defined above, and subsequently reacting the resulting dye of the formula IV

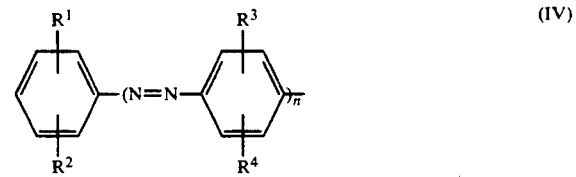

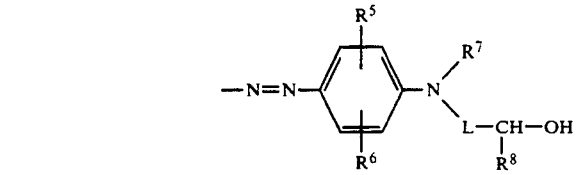

where, n, $R^1$, $R^2$, $R^3$, $R^4$, $R^5$, $R^6$, $R^7$, $R^8$ and L are each as defined above, with a vinyl ether of the formula

$$CH_2=CH-OR^9 \quad (V)$$

where $R^9$ is as defined above, which comprises carrying out the coupling reaction in a two-phase reaction mixture comprising water and an aromatic hydrocarbon, subsequently separating off the aqueous phase and reacting the dye of the formula IV, which is present in the organic phase, without intermediate isolation, with a vinyl ether of the formula V in the presence of a polybasic carboxylic acid as catalyst.

2. A process as claimed in claim 1, wherein a dibasic carboxylic acid is used as catalyst.

3. A process as claimed in claim 1, wherein maleic acid is used as catalyst.

4. A process as claimed in claim 1, wherein n is the formula I is zero.

* * * * *